(12) United States Patent
Aziz et al.

(10) Patent No.: US 10,896,455 B2
(45) Date of Patent: *Jan. 19, 2021

(54) DIGITAL ASSISTANT FOR VEHICLE RELATED ACTIVITIES

(71) Applicant: Microsoft Technology Licensing, LLC, Redmond, WA (US)

(72) Inventors: Zain Aziz, Redmond, WA (US); Ajoy Nandi, Snoqualmie, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 141 days.

This patent is subject to a terminal disclaimer.

(21) Appl. No.: 16/210,332

(22) Filed: Dec. 5, 2018

(65) Prior Publication Data

US 2019/0108567 A1 Apr. 11, 2019

Related U.S. Application Data

(63) Continuation of application No. 15/176,090, filed on Jun. 7, 2016, now Pat. No. 10,169,794.

(51) Int. Cl.

| | |
|---|---|
| *G06Q 30/00* | (2012.01) |
| *G06Q 30/06* | (2012.01) |
| *G06Q 30/02* | (2012.01) |
| *G06Q 50/30* | (2012.01) |
| *G01C 21/36* | (2006.01) |

(Continued)

(52) U.S. Cl.
CPC ....... *G06Q 30/0617* (2013.01); *G01C 21/362* (2013.01); *G06Q 10/20* (2013.01); *G06Q 30/0266* (2013.01); *G06Q 30/0278* (2013.01); *G06Q 30/0281* (2013.01);

(Continued)

(58) Field of Classification Search
None
See application file for complete search history.

(56) References Cited

U.S. PATENT DOCUMENTS 9,282,430 B1* 3/2016 Brandmaier ........... G06Q 10/06
9,942,736 B1* 4/2018 Sharp ................. G06Q 30/0261

(Continued)

OTHER PUBLICATIONS

"International Search Report and Written Opinion Issued in PCT Application No. PCT/US2017/035336", dated Jul. 20, 2017, 12 Pages.

*Primary Examiner* — Mila Airapetian
(74) *Attorney, Agent, or Firm* — Shook, Hardy & Bacon L.L.P.

(57) ABSTRACT

In representative embodiments, a digital assistant provides actionable information to a user regarding one or more vehicles owned by a user. Actionable information is typically provided in a "tip" which is a mechanism for presenting information to a user and may be presented in text, audible, or other form. The tips provided by the digital assistant are directed to helping the user with tasks associated with vehicles such as knowing when to obtain service such as oil changes, tire inflation, light replacement, brake replacement, fluid level check/fill, or other service. The digital assistant can utilize user information to automatically book service appointments, recommend times for service or other vehicle actions, route changes and so forth. Tips can also include links to a marketplace where recommended services can be obtained.

20 Claims, 5 Drawing Sheets

(51) Int. Cl.
*G06Q 10/00* (2012.01)
*G07C 5/00* (2006.01)

(52) U.S. Cl.
CPC .............. *G06Q 50/30* (2013.01); *G07C 5/006* (2013.01); *G07C 5/008* (2013.01)

(56) References Cited

U.S. PATENT DOCUMENTS

| | | | |
|---|---|---|---|
| 2007/0179800 A1* | 8/2007 | Oesterling | G06Q 30/02 |
| | | | 701/2 |
| 2009/0030885 A1* | 1/2009 | DePasquale | G07C 5/008 |
| 2013/0198027 A1* | 8/2013 | Anthonyson | G06Q 10/20 |
| | | | 705/26.4 |
| 2013/0311997 A1 | 11/2013 | Gruber et al. | |
| 2014/0108307 A1 | 4/2014 | Raghunathan et al. | |
| 2014/0136013 A1 | 5/2014 | Wolverton et al. | |
| 2014/0200739 A1* | 7/2014 | Kirsch | H04W 4/023 |
| | | | 701/1 |
| 2015/0345958 A1 | 12/2015 | Graham | |

* cited by examiner

DIGITAL ASSISTANT FOR VEHICLE RELATED ACTIVITIES

BENEFIT OF AN EARLIER FILED APPLICATION

This application claims the benefit of earlier filed patent application Ser. No. 15/176,090 entitled "Digital Assistant for Vehicle Related Activities," filed on 7 Jun. 2016.

FIELD

This application relates generally to digital assistants. More specifically, embodiments disclosed herein illustrate a digital assistant for vehicle related activities.

BACKGROUND

Digital assistants have been making inroads in various aspects of people's lives. The intent of these digital assistants are to make the life of the user easier by automating tasks or performing various tasks on behalf of a user. The currently available digital assistants rely on a narrow set of information or commands.

DETAILED DESCRIPTION

Figure 1:
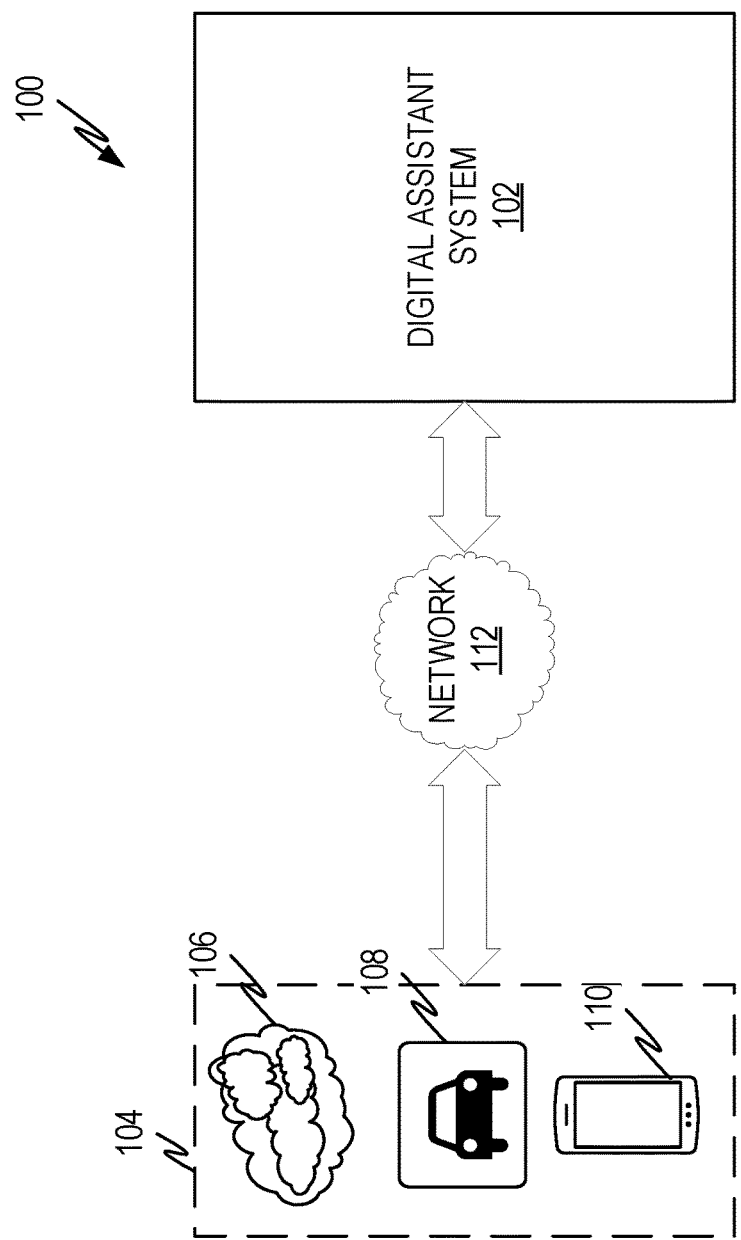
FIG. 1 illustrates an example of a system architecture.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

Users produce a wealth of data that goes unnoticed because it isn't brought to their conscious decision making process via easy, actionable insights. A digital assistant is described herein that provides actionable insights and information to a user about vehicle related activities. These insights and information can, in one aspect, save the user time, money, or both. In another aspect, these insights and information can help unburden a user from the numerous details related to vehicles. The digital assistant receives a wide variety of information about the vehicle, the user of the vehicle, and other information. An digital assistant system utilizes the received information to provide actionable information to a user that will be helpful in some way. Such actionable information can include such items as service related information for the vehicle, preventative maintenance of the vehicle, route suggestions, appointment suggestions, service fulfillment locations, itinerary suggestions, health warnings, accident reporting and so forth. The infrastructure is provided in both a reactive and proactive manner, so that presentation of information can be in response to occurrence of a sequence of events or in response to a user action. As used herein, reactive describes the system reacting to a specific request by the user ("where is the closes charging station") while proactive describes the system proactively informing the user of something ("your charge is low, would you like directions to the nearest charging station?"). Actionable information comprises information that a user can act on (as opposed to information that is only generally informative). The information sent to users will be referred to herein as "tips" and can comprise actionable information.

In the context of this disclosure a digital assistant is a system, collection of systems, service, collection of services, and/or combinations thereof that collect information from or about a user, provide tips to the user, and/or perform various tasks on behalf of the user. The digital assistants disclosed herein typically provide tips either in response to occurrence of one or more events or in response to a user action, or both, as explained in greater detail below.

Tips can include any type of information including text, audible (i.e., voice or spoken), alerts, and so forth. Tips are presented to the user using one or more devices. Thus a common tip can be sent to a single device, multiple devices, etc. or portions of a tip can be sent to one device and other portions of a tip sent to another device. In an example, an alert can be sent to one device (a phone, wearable, and so forth) while text can be sent to another (a mobile phone, desk screen, and so forth), and voice to yet a third (i.e., played over vehicle speakers). In another example, the tip (alert and other information) can be sent to multiple devices such as a wearable and a screen in a car, perhaps appropriately modified in format and/or type as needed for effective presentation on the chosen device.

DESCRIPTION

FIG. 1 illustrates an example of a system architecture, shown generally as 100. The system comprises an digital assistant system 102. The digital assistant system 102 is responsible for taking information from a plurality of sources and, in combination with a plurality of rules, identifying when an event, sequence of events, combined set of information, and/or so forth cause the digital assistant system 102 to take one or more actions in accordance with the rules. Actions can include presenting tips to a user. The digital assistant system 102 can be implemented on a system or on a plurality of systems such as those described below. Often all or part of the digital assistant system is implemented in conjunction with one or more cloud architectures so that one or more cloud services are provided and utilized.

The digital assistant system may also comprise one more data sources and/or devices 104. The data sources and/or devices 104 are connected to the digital assistant system 102 by one or more networks 112. The network or networks can be any network or combination of networks and can be wired, wireless, or a combination thereof. How data sources and/or devices 104 are connected to the digital assistant system 102 makes little difference as long as communication between them exist.

The data sources and/or devices 104 can serve various purposes. On the one hand they can be sources of information so that they provide information to the digital assistant system 102. For example, vehicle 108 may be a car, motorcycle, truck, van, or other vehicle and can be instrumented in such a way to provide information to the digital assistant system 102. An average vehicle can include numerous microprocessors and sensors. These measure and control numerous aspects of a vehicle. Any or all of this information can be provided to the digital assistant system 102. Collectively, information from or about the vehicle 108 will be referred to as vehicle information.

The vehicle information can be provided by the vehicle or can come from other data sources. The vehicle information falls into three main categories. The first category includes information that describes the vehicle, such as Vehicle Identification Number (VIN), car style, body type, color, information describing parts on the car (tire size and/or type, accessory equipment, and so forth), and/or other such information. The second category includes information that describes the condition of the vehicle and/or parts/accessories on the car. This category can include such things as number of miles driven, last service interval (oil changes, routine maintenance, and so forth), tire pressure, engine health metrics, or other such information. The third category includes other related information such as the average or instantaneous miles per gallon (mpg) or other efficiency information, level of fuel in the vehicle, state of charge (i.e., for electric vehicles), location of the vehicle, current speed, route traveled, current route, and so forth.

Another source of information can be user devices and/or systems 110. These user devices and/or systems 110 can include personal devices such as a wearable device (i.e., watch, band, glasses, and so forth), a carry-able device (i.e., mobile phone, tablet, laptop, and so forth), a stationary or semi-stationary device (i.e., portable computer, desktop computer, and so forth), and/or server devices and/or services (i.e., servers, cloud services, calendar systems, email systems, and so forth). A user interacts with all of these type of devices and/or services and they all have information that can be used by the digital assistant system 102 to provide digital assistant services to the user. This data will be collectively referred to as user data and can include information related to the user as well as information about the user such as preferences, profile information and so forth. Example information include things such as a user's calendar and/or schedule, to do list or task list, email history, purchase history, a user's normal routine, route to work, home location, work location, school location, preferred forms of communication, devices owned/interacted with, and so forth.

A final source of the information can be information from the internet, third parties, and so forth. This is illustrated as 106 in FIG. 1. This information can be about the user, the vehicle, or any other relevant information. In this context, relevant means information that will be useful in providing digital assistant tips about vehicle activities. By way of example only, such information may include location and/or price of various vehicle related products and/or services (gas prices, part prices, part lifetime such as tires should be changed every 5 years or 50,000 miles, service prices, and so forth for various locations and/or providers), information from a vehicle's manufacturer such as maintenance schedules, specifications and so forth, weather information, and so forth.

Data sources and/or devices 104 can function not only as information sources, but also as information sinks for digital assistant system 102. For example, some or all of the services, systems, devices, etc. associated with a user can have functionality to interact with digital assistant system 102. As representative examples, user devices and/or systems 110 and vehicle 108 can possess a digital assistant client, web browser, messaging system, or other channel through which a user can interact with the digital assistant system 102 in either a reactive or proactive way. These same things can also be used to receive tips and other information from the digital assistant system 102.

As an example of a reactive mode for the digital assistant system 102, a user may use a device to ask a question "where is the closest electrical charging station?" and the digital assistant system 102 can respond with a list of locations, suggested location, routing options and so forth. The user can ask the question via voice, input via a touch or text input, gesture input, gaze tracking, or any other way. Furthermore, a request and response may use different devices. A user may ask the question, for example, using a client on a mobile device 110 and the digital assistant system 102 can respond by displaying a tip on a display in vehicle 108.

As an example of a proactive mode, the digital assistant system 102 may know the vehicle's location, direction or route of travel, state of charge, rate of chare expenditure (average, instantaneous and/or projected) and based on a set of rules, send a tip to the user informing the user that if the user continues on the current route, the vehicle will likely not have sufficient charge to make it to the next charging station. For example, if the system knows the current route, the current rate of charge expenditure (or fuel expenditure), the system can calculate a prediction of when (either in time or in distance) the user will not have enough charge to reach the next charging station. What that event occurs, the user can send a tip to the user informing the user of what is about to happen.

Thus, the digital assistant system 102 can decide to show the distance that can be traveled based on the current state of charge, the rate of charge (or fuel) expenditure (average, instantaneous and/or projected), the distance to the closest charging station, the distance to the next closest charging station(s), an indication of whether the user is able to make it to one or more of the charging stations, distance to a known or inferred destination, whether the vehicle is able to make it to the destination on its current charge, whether the vehicle is able to make to destination and then back to the closest charging station, and/or any combination thereof. What information is calculated and/or inferred can be based on the set of rules. As part of the tip, the impact to the user's travel plans in time, distance, and/or other measure can be displayed either alone or in the context of how it will affect the user's plans.

As a more specific example, if the digital assistant system 102 knows that a user is on the way to an appointment at a given time and identifies that the user will be able to reach the destination but will then not have sufficient charge to reach a charging station afterward, the digital assistant system 102 can tell the user that the user will be able to make the appointment on time but will not likely have a sufficient charge to reach a charging station. In that situation, the digital assistant system 102 can offer to direct the user to the charging station and display the impact to the appointment (i.e., diverting to the charging station and taking enough charge to attend the appointment and make it back to the charging station will make the user 30 minutes late to the appointment). Additionally, or alternatively, the digital assistant system 102 can tell the user that the user will be able to make the appointment but will not likely have a sufficient charge to reach a charging station and offer different options such as providing information that shows when the likelihood of reaching the charging station drops below a given threshold, presenting a recommendation to adjustment the user's driving speed, present a recommendation to utilize an alternative route that may add time to the user's travel time but will preserve more state of charge (along with the impact to the user's appointment), and/or any combination thereof.

If a tip is to be displayed, the digital assistant system 102 may select an appropriate channel to use to alert the user to the situation. For example, the digital assistant system 102 may decide to alert the user by initiating an action that mutes the vehicle audio system (or invokes the audio system if it is off), plays an alert sound, displays on a screen within the vehicle that the state of charge may not be sufficient to reach a more distant charging station and ask the user if they would like directions to the nearest charging station. As before, multiple devices can be involved, so if the user is talking on the phone, the alert sound may be played through the phone while the tip may still be played on a screen in the vehicle.

As indicated above, the information coming into the digital assistant system 102 may help the digital assistant system 102 decide where and how to provide the tip to the user. The digital assistant system 102 can track the various devices and systems as well as the user's current context, such as what the user is currently doing, where the user is doing it, what devices are able to reach the user, and so forth, and based on the tip select a particular channel for reaching the user. The various channels can be matched with the actions the digital assistant system 102 has to transfer and an appropriate channel selected. For example, if a user has a wearable, a phone, a laptop and a desk computer as possible channels to reach the user, and the user is in a meeting located in a conference room, the digital assistant system 102 would know that the user may not be likely to receive urgent tips sent to the laptop or desktop, but may be likely to receive tips via the wearable or mobile phone. Given the context of the meeting, the digital assistant system 102 may determine that even for urgent tips, something providing an audible alert would not be welcome and thus chose to display text on the wearable and vibrate the wearable.

Channels can be selected based on rules, such as "if the user is in a meeting, do not send audible information," by probabilities/scores such as "a user is walking or exercising and likely to ignore information sent to a phone," or by any combination thereof, such as "a user is walking or exercising and is therefore likely to ignore information sent to a phone, thus, the importance of the information dictates that the alert be sent to the wearable and that both an audible alert and vibration should be used."

Other scenarios with specific inputs, outputs and so forth are described below.

Figure 2:
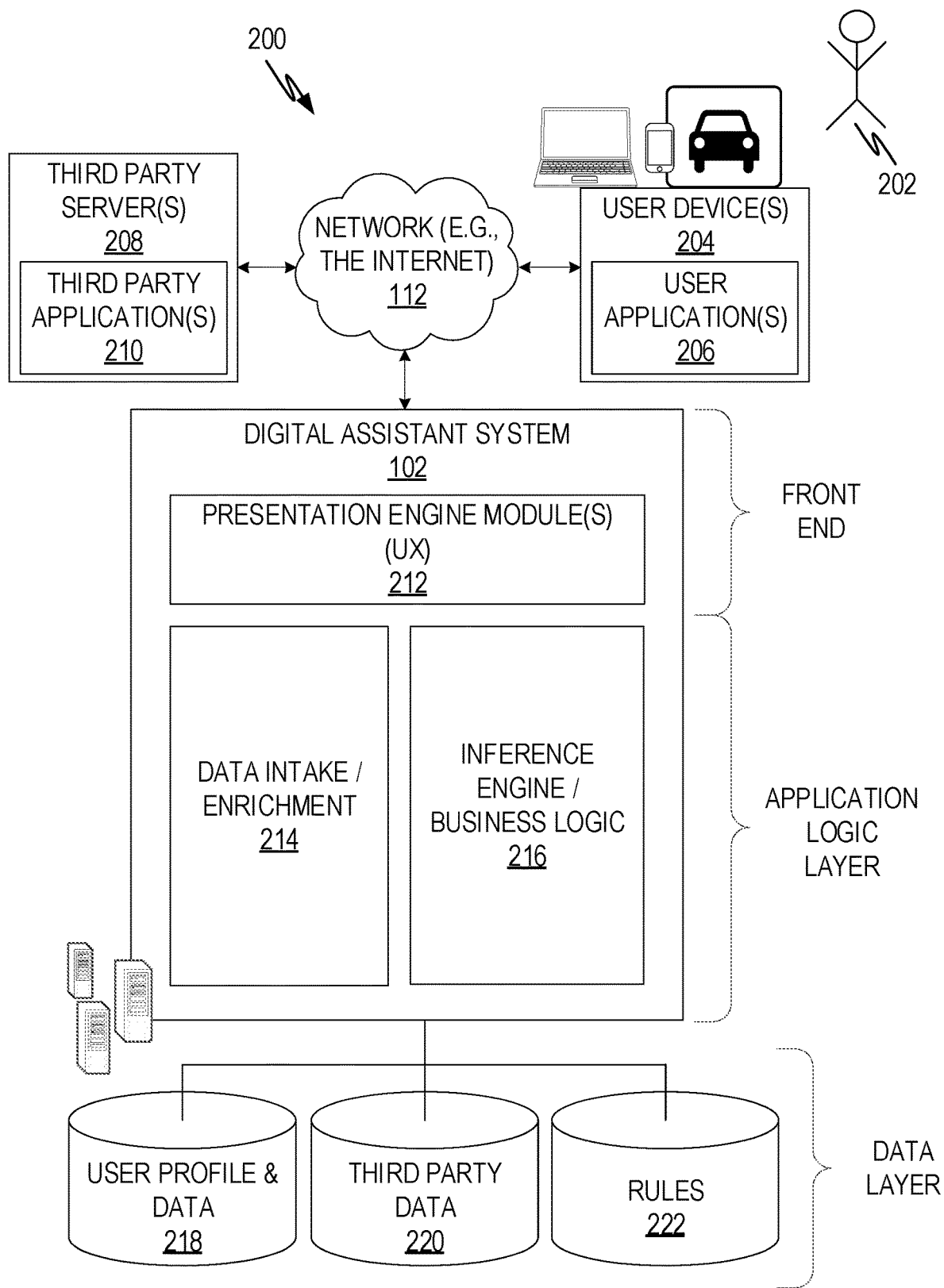
FIG. 2 illustrates an example of a system architecture.

FIG. 2 illustrates an example of a digital assistant architecture, shown generally as 200. Such an architecture shows one possible embodiment where the various aspects of an digital assistant system, such as digital assistant system 102, can be implemented in a three-tiered architecture, comprising a front-end layer, an application logic layer and a data layer. Such an architecture is only one type of cloud and/or server architecture which would be suitable for the disclosed embodiments and numerous other models and architectures could also be used. However, the three-tiered architecture is sufficient for explanation purposes and those of skill in the art would be able to understand how to implement the digital assistant architecture in other environments from the explanation provided.

As is understood by skilled artisans in the relevant computer and internet-related arts, each module or engine shown in FIG. 2 represents a set of executable software instructions and the corresponding hardware (e.g., memory and processor) for executing the instructions. To avoid obscuring the disclosed subject matter with unnecessary detail, various functional modules and engines that are not germane to conveying an understanding of the disclosed subject matter have been omitted from FIG. 2.

As shown in FIG. 2, the front end layer comprises a presentation engine 212 which can include one or more software and/or hardware implemented modules. The presentation engine is responsible for the user experience (UX) and receives information and/or requests from various client-computing devices including one or more user device(s) 204, and communicates appropriate responses to the requesting device. Thus, the presentation engine 212 can cause presentation of information (e.g., tips, etc.), user interfaces, and so forth on the user devices 204, generally through the user application(s) 206.

In this embodiment, user devices 204 can include various devices such as the wearable, carry-able, stationary/semi-stationary, server/service devices and/or systems previously discussed in conjunction with FIG. 1. In addition, one more vehicles can be considered user devices in the context of the embodiment of FIG. 2, even though such vehicle(s) may be associated with different users at different times, such as where a vehicle is shared by more than one user.

The user device(s) 204 may execute different client applications 206 that allow the device to communicate with the digital assistant system 102, typically through the presentation engine 212. Such applications can include, but are not limited to web browser applications and/or client applications (also referred to as "apps") that have been developed for one or more platforms to provide functionality to present information to the user and communicate via the network(s) 112 to exchange information with the digital assistant system 102. Each of the user devices 204 may comprise a computing device that includes at least a display and communication capabilities with the network 112 to access the digital assistant system 102. One or more users 202 may be a person, a machine, or other means of interacting with the user device(s) 204. The user(s) 202 may interact with the digital assistant system 102 via the user device(s) 204. The user(s) 202 may not be part of the networked environment, but may be associated with user device(s) 204.

As shown in FIG. 2, the data layer includes several databases and/or other types of data sores (collectively data stores), including a data store 218 for storing data associated with a user, such as user 202. The types of information that can be stored in such a data store, includes, but is not limited to, vehicle information and user information, discussed above.

The data layer can also include a third party data store, which stores information obtained from third parties, such as from third party server(s) 208 and/or third party application(s) 210. As previously explained, this information can be about the user, the vehicle, or any other relevant information. In this context, relevant means information that will be useful in providing actionable information about vehicle activities. As illustrated above, this may include location and/or price of various vehicle related products and/or services (gas prices, part prices, service prices, and so forth for various locations and/or providers), information from a vehicle's manufacturer such as maintenance schedules, specifications and so forth, weather information, and so forth. As explained in greater detail below, this information can also include information from a marketplace established to provide actionable products and services for vehicle related activities.

Another data store in the data layer can contain rules 222 for the inference engine and/or business logic 216 to operate on. Such rules specify combinations of input data, conditions and resultant action(s). In other words, a rule defines a relationship between input data and resultant action(s). An example rule might be that when the vehicle location is within a designated radius of a fuel station and when the vehicle fuel status is below a designated threshold, then recommend to the user that the user stop for fuel at a recommended fuel station. This example rule defines a relationship between user information (the user that is operating the vehicle), vehicle information (fuel status, proximity to a fuel station) and a resultant action (recommend a stop for fuel). Conditions are implied, derived, or express (fuel level below a threshold, proximity to a fuel station below a designated threshold). Although illustrated as being held in a rules store 222, rules can also reside inside and/or outside the inference engine 216 or even outside of the digital assistant system 102 itself, such as receiving rules from a different system, in any combination.

When the condition(s) of the rules are met, the actions are triggered. Example scenarios which are embodied in rules are specified below. Thus a rule in one example embodiment comprises a set (combination) of input data and/or events, a set of conditions, and a set of resultant actions. In this context a set can consist of one or more items (i.e., one or more input data, one or more conditions, and/or one or more resultant actions). The example scenarios below illustrate how the rules work.

The digital assistant system 102 also comprises data intake and/or enrichment modules 214. As data is received, the data can be processed in a variety of ways, including any combination of pre-processing operations such as validation, cleaning, normalization, transformation, feature extraction, selection, and so forth. Validation and/or cleaning generally includes of detecting and correcting data or removing data that is corrupt, inaccurate, incomplete, etc. Data cleaning can also include removing duplicate information such as where the same signal is sent twice, one can be kept and the other discarded. Validation also ensures that data is of the proper type. Normalization generally includes ensuring data is scaled appropriately, redundancies are removed, and so forth. Transformation includes mapping data from one set to another, such as when data from various sources are mapped to an equivalent data set (i.e., where part numbers from different manufacturers are transformed to a standard part numbering system) and so forth. Feature extraction includes identifying and extracting various pieces of relevant information is sometimes related to machine learning. Feature extraction can also involve reducing the dimensionality of a data set. Selection includes selecting a subset of relevant features that are of interest. Other pre-processing may also be used as appropriate.

The data intake and/or enrichment module 214 may also perform data enrichment. Data enrichment often correlates information from different sources and assembles it in a way that the data becomes "enriched" with other information. For example, user information from multiple sources can be assembled in one or more related data structures. The assembled information can then allow the digital assistant system to identify where a user is and what activities a user is engaged in.

The data intake and/or enrichment module 214 can receive and assemble information from a variety of source, represented in FIG. 2 by the third party servers 208, the third party application(s) 210, the user device(s) 204 and other sources. By way of example only, the third party application(s) 210 and/or the third party server(s) 208 can represent the sources discussed in conjunction with FIG. 1, 106. Additionally, or alternatively, the third party application(s) 210 and/or the third party server(s) 208 can represent services like email, scheduling/calendaring, and other such services. The third party application(s) 210 and/or the third party server(s) 208 can also represent other digital assistant systems like hubs which assemble information and make inferences. These can infer things like home/work/school location and activities, travel context, location and visiting patterns, route patterns, meeting contexts, communication contexts, emergency information, search contexts and so forth. Of course given the raw data, the digital assistant system 102 can also make such inferences in some embodiments.

The digital assistant system 102 also comprises the inference engine and/or business logic 216. Business logic is understood by those of skill in the art to be the software and hardware combinations that execute to provide the services and functionality of the digital assistant system 102. Hereafter, the inference engine and/or business logic 216 will simply be referred to as the inference engine 216 with the understanding that the digital assistant system 102 provides more services and functionality than a simple inference engine.

The inference engine 216 monitors the incoming information and acts in accordance with the rules of rules store 222. The inference engine 216 acts in either a reactive or proactive manner. In the proactive mode the inference engine 216 identifies that the conditions of one or more rules in rules store 222 have been met and takes the indicated actions. In the reactive mode, the inference engine 216 responds to a request from a user. Examples of reactive and proactive modes are illustrated below. Reactive and/or proactive operation can use real time signals like time, current location, information in the cloud like search history and/or other inferences to intelligently present actionable information to the user.

Figure 3:
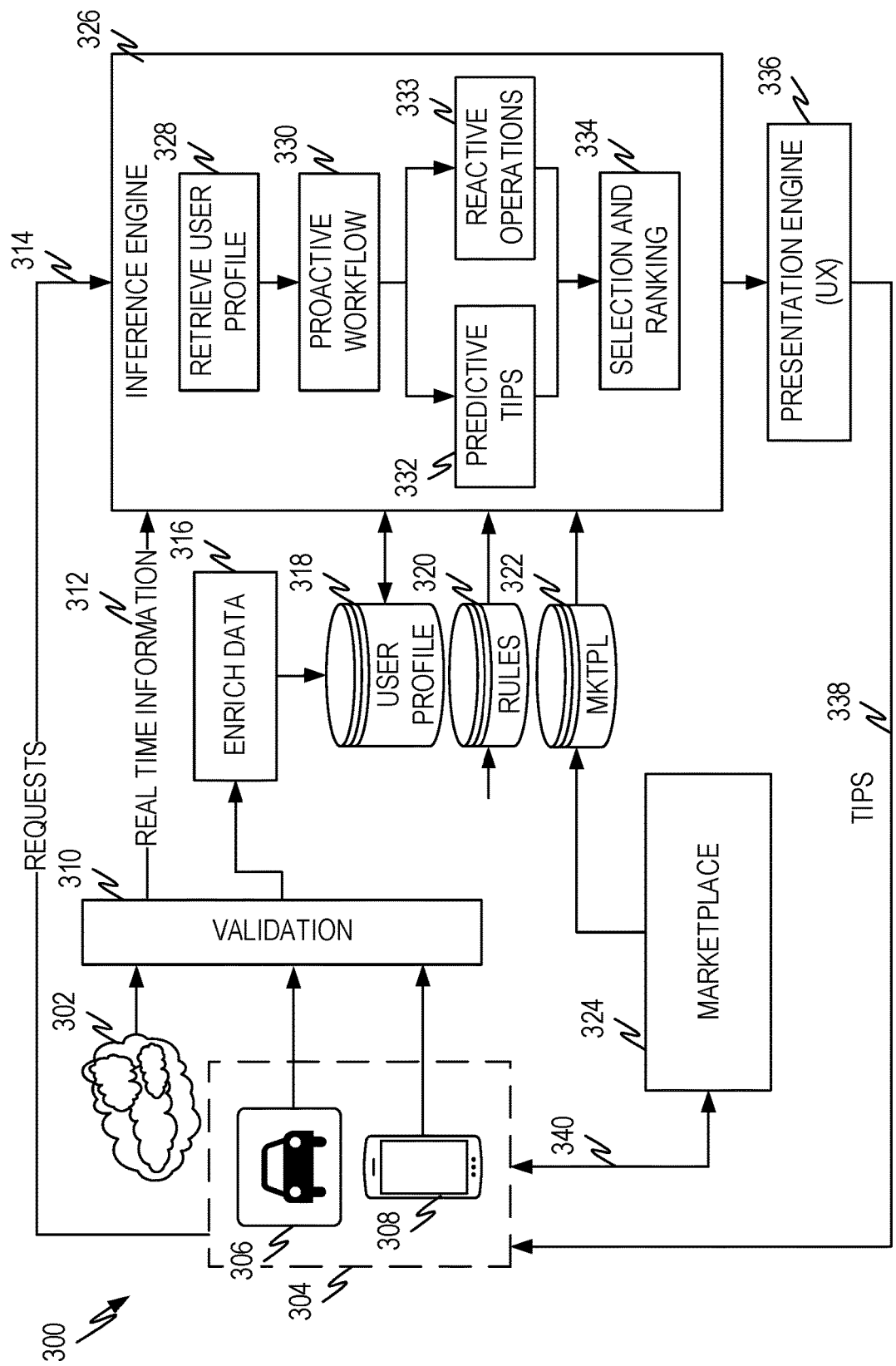
FIG. 3 illustrates another an example of a digital assistant architecture.

FIG. 3 illustrates another an example of a digital assistant architecture, shown generally as 300. As in other embodiments and examples, user devices 304 such as wearable or carry-able devices 308, vehicle 206 and/or other user devices and/or systems provide information to the digital assistant system, typically through an intake/validation engine 310 (referred to hereinafter as simply the validation engine 310). Other sources of information 302 also provide information to the digital assistant system through the validation engine 310. As in the other examples and embodiments, wearable devices include such devices as a watch, band, glasses, and so forth. Carry-able devices include such devices as a mobile phone, tablet, laptop, and so forth. User devices also include such devices as stationary or semi-stationary devices (i.e., portable computer, desktop computer, and so forth), and/or server devices and/or services (i.e., servers, cloud services, calendar systems, email systems, and so forth). Other sources of information include information from third parties, third party systems, from the internet, and so forth.

The validation engine 310 can validate the information provided by the user devices 304 and/or other sources 302 and provide validation and any other desired pre-processing as previously discussed above. Additionally, the validation engine 310 can validate and provide real time information 312 to the inference engine 326 for use as discussed below.

As the information comes in from the disparate sources it can be passed to enrichment engine 316. As discussed above, enrichment engine 316 can correlate information received from a variety of sources to create an enriched set of data that is associated with a user. The enriched set of data can be stored in a data store and be associated with a user, such as through a user profile. Conceptually, all the information relevant to a particular user can be thought of as being part of a user profile. Hence, the enriched data, along with other user information is shown as being stored in a user profile data store 318. In actual implementation, the enriched data and other user data may be stored in the same data store or in separate data stores (such as illustrated in the embodiment of FIG. 2).

The digital assistant system comprises an inference engine 326, which takes the received data and makes inferences in according with a set of rules, such as those stored in the rules data store 320. Also, as discussed above, the inference engine 326 can operate in a proactive or predictive manner as described below.

Example operation of the inference engine 326 will now be explained in conjunction with operations 328-334. Proactive workflow 330 is run on startup of the system. The proactive workflow 330 monitors the received information and provides inferences when rules are met. Thus, the proactive workflow 330 monitors any combination of the information discussed herein such as what type of car the user is driving and perhaps a list of locations that service the type of car driven by the user. If the user owns multiple vehicles, the inference engine 326 can rely either on context information already collected and stored with the user profile if it is available or real time information 312 to determine which vehicle the user is currently driving.

In a particular example, the proactive workflow 330 may identify a problem with the vehicle based on incoming sensor data and the rules and conclude that the user should be presented with options for repair or may identify preventative maintenance that should be performed. For example, the rule states that the oil should be changed at 4,000 miles from the last oil change. The proactive workflow 330 can rely on information from the user profile store 318 as well as the rules store 320 to identify the type of vehicle associated with the user, the mileage the last time the oil was changed, as well as things like the maintenance schedule, provided by the manufacturer. Real time information 312 can identify the current mileage and when the mileage is within a designated threshold, conclude the rule is met.

Once the appropriate domain (i.e., vehicle repair) is identified by the proactive workflow (operation 330), the domain along with any other relevant information is passed to the predictive operations 332. In the predictive operations 332, the inference engine 326 creates the tip using real time signals 312 from the user devices and information in the user profile and/or other information to create one or more tips to be passed to the user. For example, the proactive operations 332 can use the current time, current location, past history of where the user has had the vehicle serviced before, and the information it received from operation 330 to identify a set of options for the user to get the vehicle repaired. These options can be part of a single tip or options may be broken out into multiple tips.

Operation 334 then ranks the various options and tips and makes a final selection as to what will be presented and how it will be presented to the user. Operation 334 may also take into consideration all the other information and tips (perhaps not part of the request or not generated by the request) that are also waiting to be presented. Thus, ranking and selection may not just be among options and tips created by the immediate request but can be the result of other reactive and/or proactive operation of inference engine 326.

Tips can include any type of information including text, audible (i.e., voice or spoken), alerts, and so forth. Furthermore, tips are presented to the user using one or more devices. The current location, activity, context and so forth of the user is weighed in identifying what and how to present the selected tip(s). The system can use a set of rules to determine how the selected information is to be presented. Thus, the presentation rules, which can be separate from the rules discussed above, may comprise a set of conditions as well as a set of channels and content for those channels to be utilized. The conditions can be based on one or more user preferences (i.e., don't play anything audible when I am in a meeting), a set of predefined conditions (i.e., users don't tend to hear their phones in a noisy environment so don't pick a phone when the environmental noise level is above a certain threshold or don't pick a phone when the user is engaged in a list of activities), or a combination thereof.

Based on these rules, the inference engine 326 in operation 334 can select the device or devices that the tip(s) should be presented on as well as which aspect(s) of the tip(s) should be presented on a particular device. Thus a common tip can be sent to a single device, multiple devices, etc. or portions of a tip can be sent to one device and other portions of a tip sent to another device. In a previously discussed example, an alert can be sent to one device (a phone, wearable, and so forth) while text can be sent to another (a mobile phone, desk screen, and so forth), and voice to yet a third (i.e., played over vehicle speakers). In another previously discussed example, the tip (alert and other information) can be sent to multiple devices such as a wearable and a screen in a car, appropriately modified in format and/or type as needed for effective presentation on the chosen device. Furthermore, the system can represent tips if user action is not taken (such as an acknowledgement or other action).

Once the tips have been selected and the mode of presentation determined, presentation engine 336 presents the selected tip(s) 338 to the appropriate user device(s).

In a reactive example, the system receives a request (i.e., a request 314), such as "where can I get my car repaired." For example, the user may have recognized that the user's vehicle needs service, and desires help to identify where service can be obtained.

In such a situation, reactive operations 333 identify information that the conditions of one or more of the rules have been met based on the available information. Furthermore, reactive operations 333 can also rely on inferences made by proactive workflow 330. Thus when the system receives a request for "where can I get my car repaired," proactive workflow 330 may provide insights and/or inferences that help reactive operations 333 disambiguate what type of service the user may want. For example, the rule states that the oil should be changed at 4,000 miles from the last oil change. The predictive operations 332 can rely on information from the user profile store 318 as well as the rules store 320 to identify the type of vehicle associated with the user, the mileage the last time the oil was changed, as well as things like the maintenance schedule, provided by the manufacturer. Real time information 312 can identify the current mileage and when the mileage is within a designated threshold, conclude the rule is met. Thus reactive operations 333 may rely on this information, as well as real time information 312 to assess whether the user may want an oil change or whether the real time information from engine sensors, or other vehicle sensors would indicate the user is more likely talking about a problem detected by the vehicle sensors. Rules can be used to either select among options or to present all options that the user may be possibly asking about.

Once reactive operations 333 identify which rule(s) are met, the actions associated with the rule are carried out, including creating a tip associated with the conditions being met. In this example, the created tip may include a location where the user can obtain an oil change, inform the user that an oil change is due at a designated mileage or within a designated time period (or both), present other options for vehicle service, and/or combinations thereof. The reactive operations 333 can use the current time, current location, current mileage, past history of where the user has had the vehicle serviced before, and the information it received from operation 330 to identify a set of options for the user to get the vehicle serviced. These options can be part of a single tip or options may be broken out into multiple tips.

Operation 334 then ranks the various options and tips and makes a final selection as to what will be presented and how it will be presented to the user. Operation 334 may also take into consideration all the other information and tips (perhaps not part of the request or not generated by the request) that are also waiting to be presented. Thus, ranking and selection may not just be among options and tips created by the immediate request but can be the result of other reactive and/or proactive operation of inference engine 326.

Tips can include any type of information including text, audible (i.e., voice or spoken), alerts, and so forth. Furthermore, tips are presented to the user using one or more devices. The current location, activity, context and so forth of the user will be weighed in identifying what and how to present the selected tip(s). The system can use a set of rules to determine how the selected information is to be presented. Thus, the presentation rules, which can be separate from the rules discussed above, may comprise a set of conditions as well as a set of channels and content for those channels to be utilized. The conditions can be based on one or more user preferences (i.e., don't play anything audible when I am in a meeting), a set of predefined conditions (i.e., users don't tend to hear their phones in a noisy environment so don't pick a phone when the environmental noise level is above a certain threshold or don't pick a phone when the user is engaged in a list of activities), or a combination thereof.

Based on these rules, the inference engine 326 in operation 334 can select the device or devices that the tip(s) should be presented on as well as which aspect(s) of the tip(s) should be presented on a particular device. Thus a common tip can be sent to a single device, multiple devices, etc. or portions of a tip can be sent to one device and other portions of a tip sent to another device. In a previously discussed example, an alert can be sent to one device (a phone, wearable, and so forth) while text can be sent to another (a mobile phone, desk screen, and so forth), and voice to yet a third (i.e., played over vehicle speakers). In another previously discussed example, the tip (alert and other information) can be sent to multiple devices such as a wearable and a screen in a car, perhaps appropriately modified in format and/or type as needed for effective presentation on the chosen device. Furthermore, the system can represent tips if user action is not taken (such as an acknowledgement or other action).

Once the tips have been selected and the mode of presentation determined, presentation engine 336 presents the selected tip(s) 338 to the appropriate user device(s).

As previously discussed, tips contain actionable information. This actionable information may include recommendations on how to fulfill the user's wishes. In some embodiments, a marketplace 324 can exist to help users fulfill tips. This marketplace 324 can provide information to the digital assistant system, as represented by marketplace data store 322. Product and service providers in the marketplace can provide information like the products and/or services offered, locations, prices, discounts or other deals, business hours, and other such information. The marketplace may allow ads or other information posted by users and/or product/service providers. Furthermore, the marketplace may also be a place where users can let product or service providers know they need a product or service and the product or service providers can bid on the right to provide the product and/or provide the service for the user.

In some embodiments, the marketplace can be a connection between the digital assistant system and webapps and/or an appstore. Thus, if a company has an app that users can download to request services from the company, the "marketplace" can be a connection between the digital assistant system and that app. For example, suppose a company specializes in oil changes and has an app that lets a user interact with the company and schedule/request services and so forth. The tip can have an option to download and/or launch the app, passing the user's current location and/or other information to allow the app to provide services. In this way, fulfillment is accomplished by connecting the digital assistant system to other apps and systems to provide fulfillment.

The above illustrates how in some embodiments the marketplace can provide a channel for users and service providers to connect, if desired. The proactive operations 322 and/or the selection and ranking 334 can utilize this information to help provide actionable information to a user.

In the oil change or service examples above, the tip may include recommendations for where the user can get the car serviced or repaired based on past user behavior and/or information provided by the marketplace 322. Thus, for example, if the user regularly services his car at the dealership and a service center of the marketplace 324 has a discount on oil changes, the tip(s) 338 can provide options for the dealer as well as an indication of the service center and discount available.

Furthermore, tips can allow the user to take action. In the above example, the tip may present a selectable link that performs such actions as scheduling an appointment with the selected vendor (340 and/or a request 314), adding the appointment to the user's calendar/schedule (a request 314) based on free/busy time in the user's calendar and/or schedule, downloading a discount coupon to the user's mobile device (340, and/or tips 288), and/or so forth. Alternatively, or additionally, the user can respond audibly or in some other fashion (like with another request) to trigger the actions.

Figure 4:
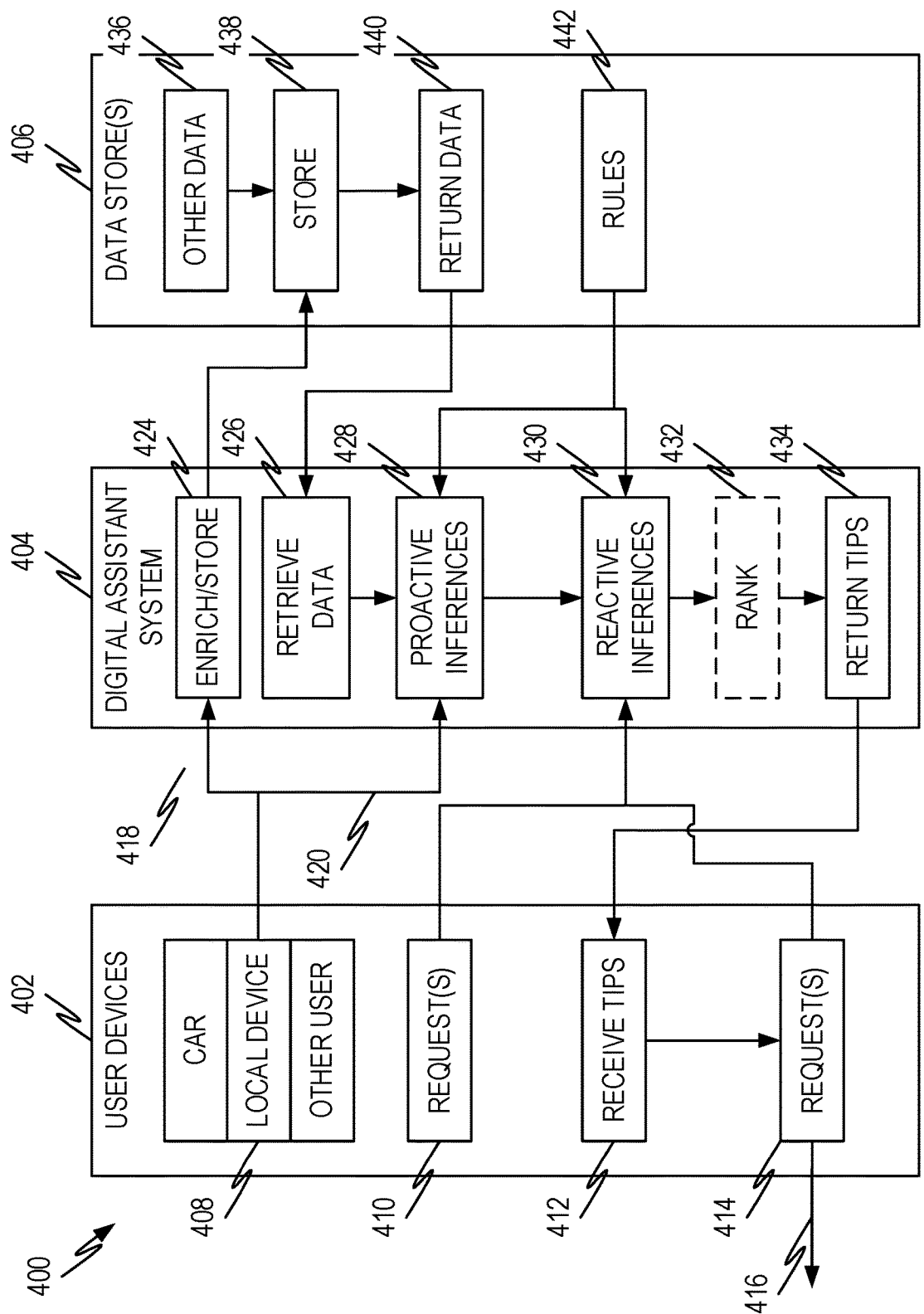
FIG. 4 illustrates an example flow diagram and interactions between the various aspects of a digital assistant architecture.

FIG. 4 illustrates an example flow diagram 400 and interactions between the various aspects of a digital assistant architecture. This flow diagram 400 shows interaction between the user devices 402, the digital assistant system 404 and data store(s) 406. User devices 402 can include one more vehicles, local devices (wearable, carry-able, semi-portable, etc. as discussed above) or other user devices (servers, services, etc. as discussed above). Collectively these are illustrated as data sources 408. These data sources provide information to the digital assistant system 404 which enriches, pre-processes, validates, etc. the data and then stores the information as shown in operation 424 and data store 438. The digital assistant system 404 can also collect information from other sources, as previously described and as illustrated by 436. Additionally, or alternatively, other data can also be preprocessed, enriched, validated, etc. by operation 424.

The digital assistant system 404 can operate reactively by receiving one or more requests 410 from one or more user devices 402. Responsive to the request, the digital assistant system 404 can retrieve data 426 stored in one more data stores 438/440. The system makes reactive inferences 430 as previously discussed in conjunction with FIG. 3.

The digital assistant system 404 can also operate proactively by monitoring received information 420 in light of retrieved data (426) and rules 422 in order to identify when one or more conditions of the rules are met. The digital assistant system 404 can then makes proactive inferences 428 in accordance with the rules as previously discussed in conjunction with FIG. 3.

The reactive inferences 430 and/or proactive inference 428 generate tips which can be ranked 432 and sent 434 to one or more user devices 412 as previously discussed in conjunction with FIG. 3.

The received tips 412 can be actionable right by the user and can thus result in requests 414 to the digital assistant system 404 and/or marketplace 416 as previously discussed.

EXAMPLE SCENARIOS

This section presents example scenarios that the architectures and diagrams above can be used to implement. The example scenarios describe representative inputs, rules (i.e., tip conditions), and resultant tips that the digital assistant can present to the user. Tips can be presented in any combination of user devices, such as previously described. For example, dashboard, phone and/or desktop digital assistant client. When the digital assistant presents or shows information to the user, the information can be conveyed and displayed using, for example, the digital assistant client applications (i.e., user application(s) 206 of FIG. 2) as described in any embodiment above. Thus, the various tips can be prioritized, selected, and otherwise presented as previously discussed.

These scenarios anticipate that the digital assistant system collects information from and about the user, user devices, and other information as described above. The information shown in the scenarios is representative and variations on the scenarios may use more information or not all of the information in the representative scenario may be needed for any give example rule and/or tip. The information can be collected from a user device, such as those mentioned in any of the embodiments above, from services and/or systems used by the user, or from any other source.

In the following examples, user information includes, but is not limited to:
Home and work locations.
User's calendar schedule such as meetings through the day, attendees, meeting locations and so forth.
User's created reminders such as any reminders created in a user's calendar schedule, with a digital assistant and so forth.
User's preferences such as eating habits, cuisine preferences, movie preferences, reservations, packages, and so forth.
User's commitments including whether the user has committed to another person to complete an action.
Requests from another user to complete a task.
User's health data from a fitness tracker or other device including such things as distance traveled, calories burned, sleep cycle and so forth.

Vehicle information includes, but is not limited to:
VIN and/or other identifying information such as vehicle manufacturer, make, model, style, body, color and so forth.
Diagnostics information such as the current condition of various parts and aspects of the vehicle, engine status and diagnostic information, and the diagnostic information about various systems of the vehicle, brakes, lights, air conditioning, etc.
Service information including service schedule, service history, and so forth.
Current state of the vehicle or its subsystems, parts, etc. including such items as tire pressure, oil level, engine health metrics, tire wear, brake status, and so forth.
Other items like miles driven, average mpg, current location, and so forth.

The digital assistant system also collects other information including, but not limited to:
Weather information including temperature, precipitation, forecasts, and so forth.
Maps, routes, vehicle requirements for particular routes and/or destinations and so forth.
Marketplace information such as product and/or service provider information, location, business hours, contact information, prices, discounts and/or deals, and so forth.

Example 1: Service Alert

Data inputs:
Vehicle signals including engine status.
Vehicle mileage.
Service schedule, service history, and/or service due.
Tire pressure.
Environmental and location data such as altitude, at a location, planned rout of travel and so forth.
Other vehicle subsystem status (brakes, fluids, lights, and so forth).
User calendar/schedule.
Service history/purchase history.
Marketplace information such as service providers, locations, prices, operating hours, and other related information.

Rules:
If miles driven since last oil service is less than a threshold, an oil change is required. Interval for oil change is specified by the manufacturer for the make and model of car the user owns. Threshold can be fixed (i.e., a given number of miles before a change is recommended) or variable based on average miles driven per day (notify a user one month before an oil change is required, and/or remind every week thereafter).
If tire pressure is a threshold value below a required value, correction is required. Recommended tire pressure can be obtained from manufacturers or other sources. Threshold is fixed based on recommended tire pressure. Recommendation is that the user fix it (user correctable problem).
Sometimes apparent sensor readings are skewed by environmental factors such as altitude. Thus, if tire pressure sensors are of the type that can give a false reading at high altitude, alerts can be identified and suppressed if they are simply due to altitude or other environmental factors and not due to an actual problem.

If engine monitor triggers indicate a problem with the engine, diagnosis and correction is required. Recommend a service provider to diagnose and/or correct the problem. Service provider recommendation is based on marketplace information, from past service history (which service provider has user used in the past), service provider expertise, cost of service, discounts available and other such information.

If subsystem monitors indicate a problem with one or more vehicle subsystems (brakes, fluids, lights, and so forth), diagnosis and/or correction is required. Recommend a service provider to diagnose and/or correct the problem. Service provider recommendation is based on marketplace information, from past service history (which service provider has user used in the past), service provider expertise, cost of service, discounts available and other such information.

Tips:

Digital assistant suggests a vehicle service showing the dealers/service providers around the user that can service the vehicle. Digital assistant shows the number to the suggested dealer/service provider and allows the user to click and dial the number to the dealer.

Digital assistant suggests a time slot according to the user's schedule when is a good time to schedule service.

Digital assistant finds time on the user's calendar and automatically creates a service appointment for the user.

Digital assistant suggests and/or creates a reminder to have service performed.

Digital assistant presents the user with coupons for service providers.

Digital assistant can provide a marketplace link where the user can place an add to have service providers offer bids for the service required.

Digital assistant informs user that a reading or warning is likely due to environmental factors such as altitude.

Example 2: Weather Related Conditions

Data input:
Weather information.
Tire traction (i.e., ABS sensors monitoring relative movement between wheels, coupled with speed information, kinetic and/or orientation information regarding yaw, acceleration, steering wheel position, engine and/or vehicle monitoring system that detect when wheels are slipping, and so forth can all be used to detect when traction is broken and/or compromised), type of tires on the car, and other tire related information.
Windshield wiper condition, time of last wiper change, and so forth.
Marketplace information including product and service providers, locations, business hours, pricing, discounts/deals, and so forth.
Rules:
If snow or slick weather is predicted, then check the vehicle condition (tires, wiper status, fluid status, and so forth). If vehicle conditions indicate it is not prepared for expected weather changes, then recommend remedial measures. Service/product provider comes from marketplace information, from past service history (which service/product provider has user used in the past), service provider expertise, cost of service, discounts available and other such information.

Tips:
Digital assistant informs user of snow that is expected in the next day or two and suggest user changes out their tires to all weather.
Digital assistant presents number for tire companies.
Digital assistant creates appointments for user to switch out their tires with tire company.
Digital assistant suggests a good time for the user to create an appointment.
Digital assistant suggests user to create a reminder.

Example 3: Fuel Savings

Data input:
Home/Work location.
Driving patterns.
Route between home and work.
Traffic conditions.
VIN #, vehicle make and model, and/or other identifying information.
Fuel (charge) status.
Marketplace information such as fuel (charge) stations, locations, business hours, prices, and other related information.
Rules:
System calculates percentage of time spent in stop and go traffic and/or non-moving (idling) time using the normally traveled route. System calculates expected time in stop and go traffic and/or non-moving (idling) time for alternative routes. System calculates miles per gallon (mpg) or other efficiency rating for all routes based on idling time, travel time, total distance, and/or actual measured mpg. If the efficiency rating for one route is better by a threshold amount, system recommends a change in route along with supporting information. If actual efficiencies are not available, they can be estimated, for example, by information provided by car manufacturer or other available information.
If fuel status and distance of usual route indicates that fuel will soon be required, inform user and provide recommendations.
If fuel status and distance of usual route indicates that fuel will be soon be required and user's schedule indicates an early morning meeting the next day, provide recommendations that accommodate the user's schedule.
Tips:
Digital assistant recommends best route to take and suggests the cheapest place to get fuel on the way to work.
Digital assistant recommends a longer route, but which has no stop and go traffic and informs the user that adding n minutes (or n distance) to the route, can save x dollars/cents in fuel as the car performs better on the new route and can save user money.
Digital assistant detects user's car is running low on fuel but user has an early morning meeting next day. Digital assistant recommends user fills gas the night before.

Example 4: Travel Time and Schedule Management

Data input:
Email/text messages
User related information such as family/friends/roommate contact information
To do and/or reminder list
Marketplace information including product and service providers, locations, business hours, pricing, discounts/deals, and so forth.
Traffic conditions Rules:

Digital assistant monitors email/text messages (i.e., communications) and extracts appointment, meeting, or other information that indicates a user will travel to a location.

Digital assistant monitors communications and extracts requests from others that could be fulfilled during planned travel.

Digital assistant monitors communications and extracts request for meeting at a location.

If extracted information indicates a user should/needs to arrive at a location within a given time, digital assistant makes appropriate recommendations (discussed below).

If vehicle status and/or condition information indicates some action should be taken (e.g., tire pressure adjusted, insufficient fuel to reach indicated location, and so forth), the recommendations account for additional time/locations where actions are taken as well as service/product suppliers as required.

If calculated travel time (taking into account route, travel time, vehicle status and/or condition, and so forth) indicates a user has allotted insufficient time to arrive at a designated location, notification is given to the client.

If a to do list or communications indicate a request that can be fulfilled during planned travel, notification is given to the client.

Tips:

Digital assistant informs the user of required travel time to designated location and any required vehicle needs (fuel, tire pressure, and so forth).

Digital assistant suggests the user has not allotted sufficient travel time to reach designated location.

Digital assistant suggests a good time for the user to create an appointment based on information extracted from a communication.

Digital assistant suggests user to create a reminder to fulfill requested task that can be handled during planned travel.

Digital assistant creates a route and suggests the route for the user to meet designated arrival time, allow fulfillment of requested tasks, and/or allow attending to vehicle needs (fuel, tire pressure, and so forth).

If a user has committed to arrive somewhere at a particular time, and the digital assistant calculates insufficient time to arrive, then Digital assistant can provide a tip saying that committed time is too short, and indicate factors that influence the choice (vehicle needs attention, car tire pressure is low, fuel status, etc., traffic, and so forth).

Digital assistant can suggest a time to leave given vehicle needs, traffic, and so forth.

Digital assistant can inform the user's friends (or other individual(s)) of user's location and that they are on their way.

Digital assistant informs the user's family/friends/roommate that they have left from work for home.

Digital assistant can set a reminder for requested task that can be fulfilled during planned travel. Digital assistant can remind user when they leave for work or pass by location to fulfill task.

Example 5: Travel Tips

Data input:
Maps
User's travel plans from calendar
User's travel plans or an indication of planned travel from messages/emails and/or other communications.
Weather and related information.
Vehicle status and/or condition (tire type on the vehicle, fuel status, and so forth).
Vehicle related information (tire size, tire chain type/size, and so forth).
Marketplace information including product and service providers, locations, business hours, pricing, discounts/deals, and so forth.

Rules:

If travel information indicates that a destination or location along the route has vehicle related conditions, notification is given to the user. For example, certain roads at certain times of the year have requirements and/or recommendations for traction tires and/or tire chains.

If time of year and/or weather related information indicates that traction tires and/or tire chains are required or likely to be required, notification is given to the user.

Vehicle information from the manufacturer and/or other sources indicates the type of tires and/or tire chains that are recommended for the vehicle and can be used in notifications/recommendations as indicated below.

If user is schedule to travel, the digital assistant retrieves user's interests and identifies points of interest, routs, and so forth that match the user's interests.

Marketplace information indicates provider of products that may be required and can be used as indicated below.

Tips:

Digital assistant shows/suggests route, points of interest, travel times, itinerary, and other travel related information.

Digital assistant indicates that certain vehicle aspects may be needed such as traction tires, tire chains, and so forth.

Digital assistant shows tire sizes, tire chain size, and so forth required by the vehicle.

Digital assistant shows product and/or service provider recommendations and allows the user to call a recommended service provider.

Digital assistant offers to place an order for a required product/service.

Digital assistant automatically schedules service for vehicle to prepare it for the trip.

Digital assistant detects user is on vacation and recommends locations user can visit on their vacation.

Digital assistant suggests and travel itinerary for the user on their vacation.

Example 6: Health Impact on Vehicle Operation

Data input:
Health related information from wearable or other instruments indicating blood pressure, calorie, user motion and trajectory, and so forth.
User location(s)
Businesses user has/is frequenting.
Vehicle information including location, operating speed, smoothness of the trajectory of the vehicle, and so forth.

Rules:

If health related information from wearable indicates possible intoxication from increase in blood pressure, notifications/actions are taken as indicated below.

If health related information from wearable indicates possible intoxication from trajectory of, smoothness of, and/or frequency analysis of user motion, notifications/actions are taken as indicated below.

If user location (business located at user location) provides alcohol, then likelihood of intoxication is increased in deciding whether to take actions indicated below.

If instrumentation on vehicle including acceleration, trajectory and so forth indicates user may be having difficulty operating the vehicle, then likelihood of intoxication is increased when deciding whether to take actions indicated below.

Tips:

Digital assistant presents information to user indicating that it is not safe to drive.

Digital assistant informs loved one that the user should not be driving

Digital assistant disables vehicle from driving if the user is unsafe to drive.

Example 7: Vehicle Sales

Data input:

Email or other communication information (parse to identify intent of the user to sell the car)

Car sales data

Vehicle problem information such as information that indicates typical problems for particular vehicles, average vehicle life, average age of vehicles still on the road, and so forth.

Vehicle state and/or status including miles driven, service records, engine and subsystem diagnostics, and so forth.

Rules:

System analyses communications to determine whether the user is considering selling a vehicle. If so, one or more actions as indicated below are taken.

If vehicle state/status indicates potential upcoming problems based on collected vehicle problem information, service records, age of vehicle, miles on vehicle, and so forth, then notification of user or other actions are taken. Potential upcoming problems can be determined by considering service already performed and average age/mileage where common problems occur. If vehicle has not had a particular problem fixed and the age/mileage shows the problem is likely to occur within a threshold time frame, a potential upcoming problem is identified.

If vehicle sales information shows user should consider selling based on price vs. state/status curve for vehicle, then notification or other actions taken.

If vehicle information indicates user should consider selling based on a certain number of miles have been crossed or based on value of their car is more than a threshold number, then notification or other actions taken.

If vehicle information indicates a user should consider leasing or buying a vehicle based on vehicle demand (sales data above a threshold) or based on increased maintenance costs (vehicle health), then notification or other actions taken. Vehicle health can be ascertained from problem information, diagnostic information, service records as described above.

Tips:

Digital assistant informs user of possible upcoming problems.

Digital assistant recommends sale of the vehicle and reasoning (i.e., which tip conditions triggered recommendation).

Digital assistant displays vehicle sales listings.

Digital assistant can provide a marketplace link where the user can place an advertisement to have service providers offer bids for the vehicle.

Digital assistant can provide a marketplace link where the user can place an advertisement for the vehicle.

Digital assistant automatically lists the vehicle for sale.

Example 8: Accident/Problem Notification

Data input:

Vehicle diagnostic and status data.

User contact and relationship information.

Tip conditions:

If car diagnostic information indicates car has been in an accident, take one or more actions below.

If car diagnostic information indicates car has stopped running, is out of fuel, or other issue preventing user from arriving at destination, take one or more actions below.

Tips:

Digital assistant informs loved one/contacts that vehicle has been in an accident.

Digital assistant informs lived one/contacts location of vehicle at time of accident.

Digital assistant informs emergency personnel that vehicle has been in an accident.

Digital assistant informs emergency personnel location of vehicle at time of accident.

Digital assistant informs loved one/contacts that vehicle has stopped due to a problem (fuel, flat tire, etc.).

Digital assistant requests help from or informs user's close circle of a problem with the vehicle (fuel, flat tire, etc.)

Digital assistant provides a link user to do any of the preceding.

Example Machine Architecture and Machine-Readable Medium

Figure 5:
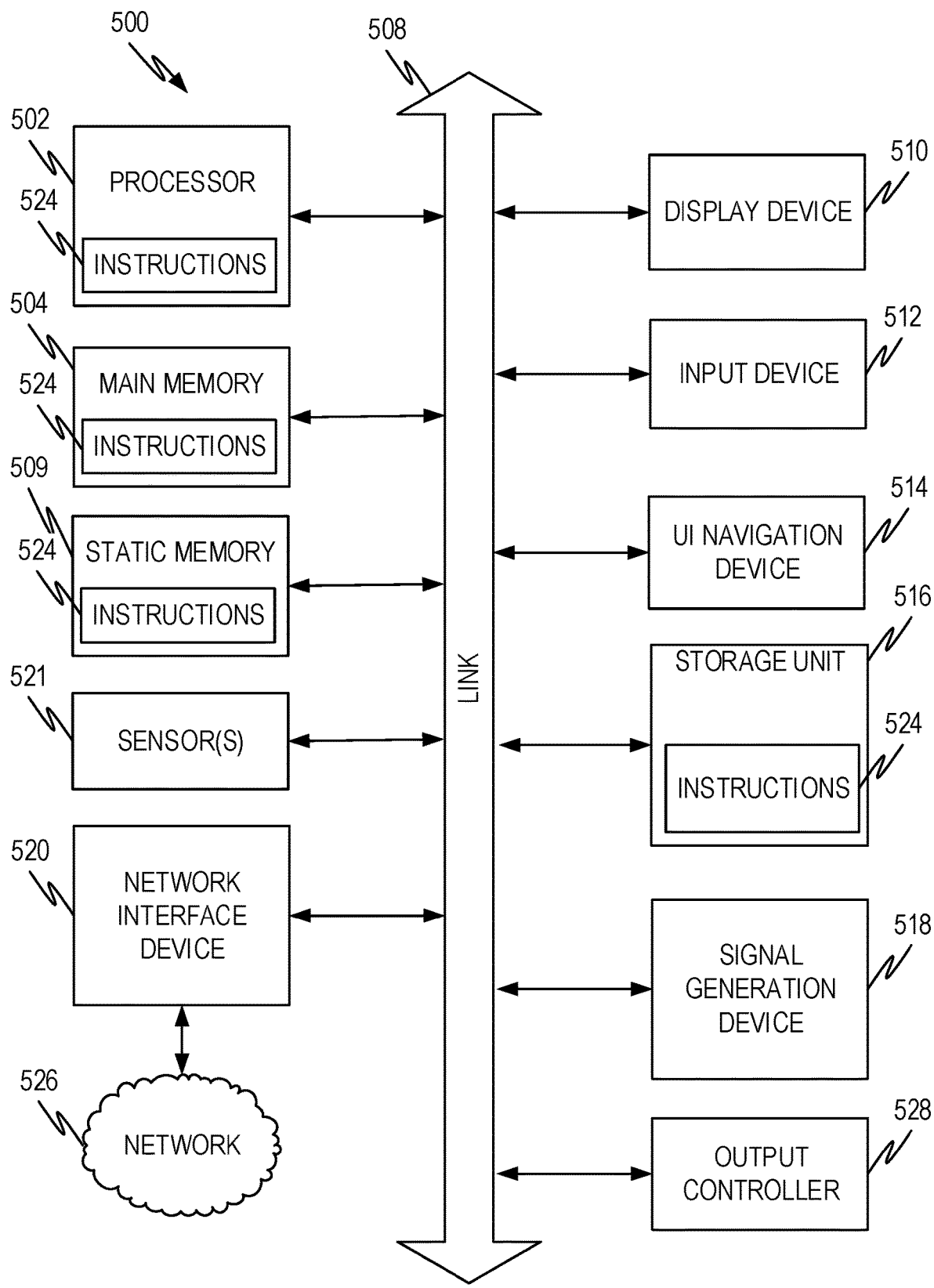
FIG. 5 illustrates a representative architecture of a machine suitable for implementing the digital assistant, user devices, etc. or executing the methods disclosed herein.

FIG. 5 illustrates a representative architecture of a machine suitable for implementing the digital assistant, user devices, etc. or executing the methods disclosed herein. The machine of FIG. 5 is shown as a standalone device, which is suitable for implementation of the concepts above. For the server aspects described above a plurality of such machines operating in a data center and providing one or more of the cloud architectures disclosed above is most often used. For user device aspects described above, only certain of the functions will be utilized. Thus a wearable may have a screen, a touch screen input, while a portable or semi-portable may not have a touch screen input. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). In accordance with this, wearable, carry-able, portable or semi-portable, server, cloud, and other architectures may have different combinations of the features outlined below. However, the example explanation of FIG. 5 is suitable to allow those of skill in the art to determine how to implement the embodiments previously described with an appropriate combination of hardware and software. In accordance with this, wearable, carry-able, portable or semi-portable, server, cloud, and other architectures may have different combinations of the features outlined below.

While only a single machine is illustrated, the term "machine" shall also be taken to include any collection of machines that individually or jointly execute a set (or multiple sets) of instructions to perform any one or more of the methodologies discussed herein.

The example of the machine 500 includes at least one processor 502 (e.g., a central processing unit (CPU), a graphics processing unit (GPU), advanced processing unit (APU), or combinations thereof), one or more memories such as a main memory 504, a static memory 506, or other types of memory, which communicate with each other via bus 508. The machine 500 may include further optional aspects such as a graphics display unit 510 comprising any type of display. The machine 500 may also include other optional aspects such as an alphanumeric input device 512 (e.g., a keyboard, touch screen, and so forth), a user interface (UI) navigation device 514 (e.g., a mouse, trackball, touch device, and so forth), a storage unit 516 (e.g., disk drive or other storage device(s)), a signal generation device 518 (e.g., a speaker), sensor(s) 521 (e.g., global positioning sensor, accelerometer(s), microphone(s), camera(s), and so forth), output controller 528 (e.g., wired or wireless connection to connect and/or communicate with one or more other devices such as a universal serial bus (USB), near field communication (NFC), infrared (IR), serial/parallel bus, etc.), and a network interface device 520 (e.g., wired and/or wireless).

Executable Instructions and Machine-Readable Medium

The various memories (i.e., 504, 509, and/or memory of the processor(s) 502) and/or storage unit 516 may store one or more sets of instructions and data structures (e.g., software) 524 embodying or utilized by any one or more of the methodologies or functions described herein. These instructions, when executed by processor(s) 502 cause various operations to implement the disclosed embodiments.

As used herein, the terms "machine-readable medium" and "computer-readable medium" mean the same thing and may be used interchangeably in this disclosure. The terms include a single medium or multiple media (e.g., a centralized or distributed database, and/or associated caches and servers) that store the one or more instructions or data structures. The terms shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The terms shall accordingly be taken to include, but not be limited to, solid-state memories, and optical and magnetic media. Specific examples of machine-readable media/computer-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The terms "machine-readable medium" and/or "computer-readable medium" specifically exclude non-statutory signals per se, which are covered under the term "signal medium" discussed below.

Signal Medium

The term "signal medium" shall be taken to include any form of modulated data signal and signals per se. The term "modulated data signal" means a signal that has one or more of its characteristics set or changed in such a matter as to encode information in the signal.

EXAMPLE EMBODIMENTS

Example 1

A method implemented by a digital assistant comprising:
receiving data comprising:
user data comprising at least one of: user communication information in the form of email, text messaging or both; user calendar or schedule information; and user created reminders;
vehicle information comprising at least one of: vehicle identifying information; vehicle state or status information; vehicle service information; and vehicle diagnostic information;
receiving a set of rules, each of which describe a relationship between user data, vehicle information, and a tip containing actionable information regarding the vehicle;
identifying at least one tip comprising actionable vehicle information based on occurrence of the relationship between user data, vehicle information and the at least one tip;
selecting at least one channel to present the at least one tip to a user associated with the user data and the vehicle information; and
presenting the at least one tip via the at least one channel to the user.

Example 2

The method of Example 1, wherein the data received further comprises marketplace information comprising product, service, or both product and service information.

Example 3

The method of Example 1 wherein the data received further marketplace information comprising service providers, product providers, locations of service and product providers, prices, operating hours, and any deals offered by a service or product provider.

Example 4

The method of Examples 2 or 3 wherein the rules further identify a relationship between a product provider or service provider.

Example 5

The method of Examples 1, 2 or 3 wherein the actionable information provided in the at least one tip contains a link to a marketplace where fulfillment of the at least one tip can be obtained.

Example 6

The method of Examples 1, 2 or 3 wherein the actionable information provided in the at least one tip comprises a phone number for a service provider.

Example 7

The method of Examples 1, 2 or 3 wherein the actionable information comprises service for a vehicle.

Example 8

The method of Examples 1, 2 or 3 wherein the actionable information comprises a user action with regard to the vehicle.

Example 9

A computing system implementing a digital assistant comprising:
a processor and executable instructions accessible on a machine-readable medium that, when executed, cause the system to perform operations comprising:
receive data comprising:
user data comprising at least one of: user communication information in the form of email, text messaging or both; user calendar or schedule information; and user created reminders;
vehicle information comprising at least one of: vehicle identifying information; vehicle state or status information; vehicle service information; and vehicle diagnostic information; and
marketplace information comprising at least one of: a product provider, a service provider, a location of the product provider or the service provider, business hours of the product provider or the service provider, discounts offered by the product provider or the service provider;
receive a set of rules, each of which describe a relationship between user data, vehicle information, and a tip containing actionable information regarding the vehicle;
identify at least one tip comprising actionable vehicle information based on occurrence of the relationship between user data, vehicle information and the at least one tip;
select at least one channel to present the at least one tip to a user associated with the user data and the vehicle information; and
present the at least one tip via the at least one channel to the user.

Example 10

The system of Example 9, wherein set of rules comprises at least one of:
if miles driven since last oil service is less than a threshold, then the at least one tip comprises an oil change recommendation;
if tire pressure is a threshold value below a required value, then the at least one tip comprises a corrective notice for tire pressure;
if engine monitor triggers indicate a problem with the engine, then the at least one tip comprises an engine correction notice or a recommended engine service provider; and
if subsystem monitors indicate a problem with one or more vehicle subsystems, then the at least one tip comprises a subsystem correction notice or a recommended subsystem service provider.

Example 11

The system of Example 10, wherein the recommended engine service provider and the recommended subsystem service provider are based on at least one of: past user service procurement, cost, service provider expertise, or discounts available.

Example 12

The system of Example 10, wherein the threshold is a fixed threshold based upon a recommendation by a manufacturer for a vehicle operated by the user.

Example 13

The system of Example 10, wherein the threshold is based on an average number of miles driven per day and a recommendation by a manufacturer for a vehicle operated by the user.

Example 14

The system of Examples 9, 10, 11, 12, or 13 wherein set of rules comprises at least one of:
if vehicle state/status indicates potential upcoming problems based on at least one of collected vehicle problem information, service records, age of vehicle, or miles on vehicle, then the at least one tip comprises a recommendation to sell the vehicle;
if a value of a vehicle owned by the user is above a threshold, then at least one tip comprises a recommendation to sell the vehicle;
if vehicle mileage is above a threshold, then at least one tip comprises a recommendation to sell the vehicle; and
if vehicle demand is above a threshold or if projected maintenance costs are above a threshold, then at least one tip comprises a recommendation to sell the vehicle.

Example 15

A machine-readable medium having executable instructions encoded thereon, which, when executed by at least one processor of a machine, cause the machine to perform operations comprising:
receive data comprising:
user data comprising at least one of: user communication information in the form of email, text messaging or both; user calendar or schedule information; and user created reminders;
vehicle information comprising at least one of: vehicle identifying information; vehicle state or status information; vehicle service information; and vehicle diagnostic information;
receive a set of rules, each of which describe a relationship between user data, vehicle information, and a tip containing actionable information regarding the vehicle;
identify at least one tip comprising actionable vehicle information based on occurrence of the relationship between user data, vehicle information and the at least one tip;
select at least one channel to present the at least one tip to a user associated with the user data and the vehicle information; and
present the at least one tip via the at least one channel to the user.

Example 16

A method implemented by a digital assistant comprising:
receiving data comprising:
user data comprising at least one of: user communication information in the form of email, text messaging or both; user calendar or schedule information; and user created reminders;

vehicle information comprising at least one of: vehicle identifying information;
vehicle state or status information; vehicle service information; and vehicle diagnostic information;
receiving a set of rules, each of which describe a relationship between user data, vehicle information, and a tip containing actionable information regarding the vehicle;
identifying at least one tip comprising actionable vehicle information based on occurrence of the relationship between user data, vehicle information and the at least one tip;
selecting at least one channel to present the at least one tip to a user associated with the user data and the vehicle information; and
presenting the at least one tip via the at least one channel to the user.

Example 17

The method of Example 16, wherein the data received further comprises marketplace information comprising product, service, or both product and service information.

Example 18

The method of Example 16 wherein the data received further marketplace information comprising service providers, product providers, locations of service and product providers, prices, operating hours, and any deals offered by a service or product provider.

Example 19

The method of Examples 17 or 18 wherein the rules further identify a relationship between a product provider or service provider.

Example 20

The method of Examples 16, 17, 18 or 19 wherein the actionable information provided in the at least one tip contains a link to a marketplace where fulfillment of the at least one tip can be obtained.

Example 21

The method of Examples 16, 17, 18, 19 or 20 wherein the actionable information provided in the at least one tip comprises a phone number for a service provider.

Example 22

The method of Examples 16, 17, 18, 19, 20 or 21 wherein the actionable information comprises service for a vehicle.

Example 23

The method of Examples 16, 17, 18, 19, 20, 21 or 22 wherein the actionable information comprises a user action with regard to the vehicle.

Example 24

A computing system implementing a digital assistant comprising:
a processor and executable instructions accessible on a machine-readable medium that, when executed, cause the system to perform operations comprising:
receive data comprising:
user data comprising at least one of: user communication information in the form of email, text messaging or both; user calendar or schedule information; and user created reminders;
vehicle information comprising at least one of: vehicle identifying information;
vehicle state or status information; vehicle service information; and vehicle diagnostic information; and
marketplace information comprising at least one of: a product provider, a service provider, a location of the product provider or the service provider, business hours of the product provider or the service provider, discounts offered by the product provider or the service provider;
receive a set of rules, each of which describe a relationship between user data, vehicle information, and a tip containing actionable information regarding the vehicle;
identify at least one tip comprising actionable vehicle information based on occurrence of the relationship between user data, vehicle information and the at least one tip;
select at least one channel to present the at least one tip to a user associated with the user data and the vehicle information; and
present the at least one tip via the at least one channel to the user.

Example 25

The system of Example 24, wherein set of rules comprises at least one of:
if miles driven since last oil service is less than a threshold, then the at least one tip comprises an oil change recommendation;
if tire pressure is a threshold value below a required value, then the at least one tip comprises a corrective notice for tire pressure;
if engine monitor triggers indicate a problem with the engine, then the at least one tip comprises an engine correction notice or a recommended engine service provider; and
if subsystem monitors indicate a problem with one or more vehicle subsystems, then the at least one tip comprises a subsystem correction notice or a recommended subsystem service provider.

Example 26

The system of Example 25, wherein the recommended engine service provider and the recommended subsystem service provider are based on at least one of: past user service procurement, cost, service provider expertise, or discounts available.

Example 27

The system of Examples 25, or 26 wherein the threshold is a fixed threshold based upon a recommendation by a manufacturer for a vehicle operated by the user.

Example 28

The system of Examples 25, or 26 wherein the threshold is based on an average number of miles driven per day and a recommendation by a manufacturer for a vehicle operated by the user.

Example 29

The system of Examples 24, 25, 26, 27, or 28 wherein set of rules comprises at least one of:

if vehicle state/status indicates potential upcoming problems based on at least one of collected vehicle problem information, service records, age of vehicle, or miles on vehicle, then the at least one tip comprises a recommendation to sell the vehicle;

if a value of a vehicle owned by the user is above a second threshold, then at least one tip comprises a recommendation to sell the vehicle;

if vehicle mileage is above a third threshold, then at least one tip comprises a recommendation to sell the vehicle; and if vehicle demand is above a fourth threshold or if projected maintenance costs are above a fifth threshold, then at least one tip comprises a recommendation to sell the vehicle.

Example 30

A machine-readable medium having executable instructions encoded thereon, which, when executed by at least one processor of a machine, cause the machine to perform operations comprising:

receive data comprising:

user data comprising at least one of: user communication information in the form of email, text messaging or both; user calendar or schedule information; and user created reminders;

vehicle information comprising at least one of: vehicle identifying information;

vehicle state or status information; vehicle service information; and vehicle diagnostic information;

receive a set of rules, each of which describe a relationship between user data, vehicle information, and a tip containing actionable information regarding the vehicle;

identify at least one tip comprising actionable vehicle information based on occurrence of the relationship between user data, vehicle information and the at least one tip;

select at least one channel to present the at least one tip to a user associated with the user data and the vehicle information; and present the at least one tip via the at least one channel to the user.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method implemented by a digital assistant comprising:

receiving data comprising:

user data comprising at least one of: user communication information in a form of email, text messaging or both; user calendar or schedule information; user created reminders; and user request information;

vehicle information comprising at least one of: vehicle identifying information; vehicle state or status information; vehicle service information; and vehicle diagnostic information;

receiving a set of rules, each of which describe a relationship between the user data or the vehicle information and a tip containing actionable information;

responsive to the user data not comprising the user request information, select a proactive mode of operation, and in the proactive mode of operation:

monitor the user data and the vehicle information to identify whether a first rule of the set of rules are met; and responsive to the first rule being met, identifying a first tip comprising first actionable vehicle information;

responsive to the user data comprising the user request information, select a reactive mode of operation, and in the reactive mode of operation:

evaluating the user data and the vehicle information to determine whether a second rule in the set of rules are met; and responsive to the second rule being met, identifying a second tip comprising second actionable vehicle information;

responsive to the first rule or the second rule being met in the proactive or reactive mode of operation, selecting at least one channel to present the first tip or the second tip to a user associated with the user data and the vehicle information; and presenting the first tip or the second tip via the at least one channel to the user.

2. The method of claim 1, wherein the data further comprises marketplace information comprising product, service, or both product and service information.

3. The method of claim 1, wherein the data further comprises marketplace information comprising service providers, product providers, locations of service and product providers, prices, operating hours, and any deals offered by a service or product provider.

4. The method of claim 1, wherein the set of rules further identify a relationship between a product or service provider and the first or second tip.

5. The method of claim 1, wherein the actionable information provided in the first tip or the second tip contains a link to a marketplace where fulfillment of the first tip or the second tip can be obtained.

6. The method of claim 1, wherein the actionable information provided in the first tip or the second tip comprises a phone number for a service provider.

7. The method of claim 1, wherein the actionable information comprises service for a vehicle.

8. The method of claim 1, wherein the actionable information comprises a user action with regard to a vehicle.

9. A non-transitory machine-readable medium having executable instructions encoded thereon, which, when executed by at least one processor of a machine, cause the machine to perform operations comprising:

receive data comprising:

user data comprising at least one of: user communication information in a form of email, text messaging or both; user calendar or schedule information; user created reminders; and user request information;

vehicle information comprising at least one of: vehicle identifying information; vehicle status information; vehicle service information; and vehicle diagnostic information; and marketplace information comprising at least one of: a product provider, a service provider, a location of the product provider or the service provider, business hours of the product provider or the service provider, discounts offered by the product provider or the service provider;

receive a set of rules, each of which describe a relationship between the user data or the vehicle information and a tip containing actionable information;

when the user data does not comprise the user request information, select a proactive mode of operation and in the proactive mode of operation:

monitor the user data and the vehicle information to identify whether a first rule of the set of rules are met;

responsive to the first rule being met, identify a first tip comprising first actionable vehicle information;

when the user data comprises the user request information, select a reactive mode of operation, and in the reactive mode of operation:

evaluate the user data and the vehicle information, to determine whether a second rule in the set of rules are met;

responsive to the second rule being met, identify a second tip comprising second actionable vehicle information;

responsive to the first or second rule being met in the proactive or reactive mode of operation, select at least one channel to present the first tip or the second tip to a user associated with or specified by the user data; and present the first tip or the second tip via the at least one channel to the user.

10. The machine-readable medium of claim 9, wherein the set of rules comprises at least one of:

responsive to miles driven since last oil service being less than a threshold, then the first tip comprises an oil change recommendation;

responsive to tire pressure being a threshold value below a required value, then the first tip comprises a corrective notice for tire pressure;

responsive to engine monitor triggers indicating a problem with the engine, the first tip comprising an engine correction notice or a recommended engine service provider; and responsive to subsystem monitors indicating a problem with one or more vehicle subsystems, the first tip comprising a subsystem correction notice or a recommended subsystem service provider.

11. The machine-readable medium of claim 10, wherein the recommended engine service provider and the recommended subsystem service provider are based on at least one of: past user service procurement, cost, service provider expertise, or discounts available.

12. The machine-readable medium of claim 10, wherein the threshold is a fixed threshold based upon a recommendation by a manufacturer for a vehicle operated by the user.

13. The machine-readable medium of claim 10, wherein the threshold is based on an average number of miles driven per day and a recommendation by a manufacturer for a vehicle operated by the user.

14. The machine-readable medium of claim 9, wherein the set of rules comprises at least one of:

responsive to vehicle status indicating a potential problems based on at least one of collected vehicle problem information, service records, an age of vehicle, or miles on vehicle, the first tip comprising a first recommendation to sell vehicle;

responsive to a value of a vehicle owned by the user being above a first threshold, the first tip comprises a second recommendation to sell vehicle;

responsive to a vehicle mileage being above a second threshold, the first tip comprises a third recommendation to sell vehicle; and responsive to a vehicle demand being above a third threshold or responsive to projected maintenance costs being above a fourth threshold, the first tip comprises a fourth recommendation to sell vehicle.

15. The machine-readable medium of claim 14, wherein the potential problems is identified in response to service records indicate the potential problem has not been corrected, and the age of vehicle or the miles on vehicle is within an age or miles threshold distance when the potential problem is likely to occur.

16. The machine-readable medium of claim 9, wherein the first tip comprises obtaining snow tires or tire chains.

17. The machine-readable medium of claim 9, wherein:

the vehicle information comprises the vehicle diagnostic information;

the set of rules comprises at least one of:

responsive to the vehicle diagnostic information indicating a vehicle has been in an accident, select the first tip from a first set of tips; and responsive to the vehicle diagnostic information indicating the vehicle has a condition comprising: stopped operating; out of fuel or charge; is not moving for a time period exceeding a threshold, selecting the first tip from a second set of tips;

wherein the first set of tips comprises:

informing one or more user contacts that the vehicle has been in the accident;

informing the one or more user contacts a vehicle location at time of the accident;

informing emergency personnel that the vehicle has been in the accident;

informing the emergency personnel the vehicle location at time of the accident;

or provide an operator of the vehicle with an option to initiate the first tip;

wherein the second set of tips comprises:

informing the one or more user contacts that the vehicle has the condition;

informing the one or more user contacts the vehicle location at time of the condition;

requesting help for the condition; or provide the operator of the vehicle with an option to initiate the second tip.

18. A computing system implementing a digital assistant comprising:

a processor and executable instructions accessible on a machine-readable medium that, when executed, cause the computing system to perform operations comprising:

receive data comprising:

user data comprising at least one of: user communication information in a form of email, text messaging or both; user calendar or schedule information; user created reminders; and user request information;

vehicle information comprising at least one of: vehicle identifying information; vehicle state or status information; vehicle service information; and vehicle diagnostic information;

receive a set of rules, each of which describe a relationship between the user data or the vehicle information and a tip containing actionable information;

responsive to the data comprising the user request information, selecting a reactive mode of operation;

responsive to the data comprising no user request information, selecting a proactive mode of operation;

evaluating the user data and the vehicle information to identify one or more rules in the set of rules that are met;

responsive to identifying the one or more rules that are met:

identify at least one tip comprising actionable vehicle information;

select at least one channel to present the at least one tip to a user associated with the user data or the vehicle information; and present the at least one tip via the at least one channel to the user.

19. The computing system of claim 18, wherein the data further comprises marketplace information of service providers, product providers, locations of service and product providers, prices, operating hours, or any deals offered by a service or product provider.

20. The computing system of claim 18, wherein the set of rules further identify a relationship between a product provider and service provider.

\* \* \* \* \*